United States Patent
Hasegawa et al.

(10) Patent No.: US 8,177,935 B2
(45) Date of Patent: May 15, 2012

(54) LAMINATED PLATE AND END TREATMENT METHOD OF THE LAMINATED PLATE

(75) Inventors: Takahiro Hasegawa, Iida (JP); Sinya Noto, Iida (JP)

(73) Assignee: Meiwa Industry Co., Ltd., Atsugi-shi (JP)

( * ) Notice: Subject to any disclaimer, the term of this patent is extended or adjusted under 35 U.S.C. 154(b) by 161 days.

(21) Appl. No.: 12/518,380

(22) PCT Filed: Dec. 7, 2007

(86) PCT No.: PCT/JP2007/073646
§ 371 (c)(1),
(2), (4) Date: Jul. 10, 2009

(87) PCT Pub. No.: WO2008/072560
PCT Pub. Date: Jun. 19, 2008

(65) Prior Publication Data
US 2010/0021675 A1    Jan. 28, 2010

(30) Foreign Application Priority Data
Dec. 11, 2006    (JP) .................................. 2006-333707

(51) Int. Cl.
*B29C 65/00* (2006.01)
*B29C 65/10* (2006.01)
*B32B 37/00* (2006.01)
*B32B 37/04* (2006.01)
*B32B 38/00* (2006.01)

(52) U.S. Cl. ........ 156/251; 156/250; 156/252; 156/253; 156/256; 156/580; 156/583.1

(58) Field of Classification Search .......... 156/250–253, 156/256, 580, 583.1; 428/73
See application file for complete search history.

(56) References Cited

U.S. PATENT DOCUMENTS
| | | | | |
|---|---|---|---|---|
| 3,673,057 A | * | 6/1972 | Fairbanks | ...................... 428/116 |
| 6,713,150 B2 | * | 3/2004 | Alts et al. | ......................... 428/73 |
| 6,828,001 B2 | * | 12/2004 | Tokonabe et al. | ............... 428/69 |

FOREIGN PATENT DOCUMENTS
| | | |
|---|---|---|
| JP | 6-305062 A | 11/1994 |
| JP | 2001-018308 A | 1/2001 |
| JP | 2001-239596 A | 9/2001 |
| JP | 2005-035071 A | 2/2005 |

OTHER PUBLICATIONS
Machine Translation of JP 06-305062, Nov. 1994.* Machine Translation of JP 2001-239596, Sep. 2001.*
Examiner's Comments and English translation thereof issued in counterpart Chinese patent application on Oct. 30, 2009, 9 pgs.
Examiner's Comments and English translation thereof issued on counterpart Great Britain patent application on Dec. 8, 2011, 2 pgs.
Official Action issued in counterpart Great Britain patent application on Feb. 16, 2011, 1 page.

* cited by examiner

*Primary Examiner* — Mark A Osele
*Assistant Examiner* — Christopher C Caillouet
(74) *Attorney, Agent, or Firm* — Foley & Lardner LLP

(57) ABSTRACT

A manufacturing method of a laminated plate (19) includes: a first step of supporting, by a support member (9), a thermoplastic resin-made laminated material (1) in which a pair of plate-like members (3, 4) are laminated to each other while interposing a longitudinal wall portion (2*b*) so that a peripheral edge portion (1*a*) of the laminated material (1) can be exposed, and heating and softening the peripheral edge portion (1*a*) by blowing a hot air to the peripheral edge portion (1*a*); and a second step of pressing the plate-like member (4) as one of the pair of plate-like members (3, 4) against other plate-like member (3) by thrusting a cutting blade (17*a*) of a cutting die (17) against the heated and softened peripheral edge portion (1*a*), thereby bringing the pair of plate-like members (3, 4) into contact with each other and welding the plate-like members (3, 4) to each other, and then cutting the laminated plate (19) out of the laminated material (1).

4 Claims, 6 Drawing Sheets

LAMINATED PLATE AND END TREATMENT METHOD OF THE LAMINATED PLATE

TECHNICAL FIELD

The present invention relates to a laminated plate and an end treatment method of the laminated plate.

BACKGROUND ART

Heretofore, as a laminated plate, there has been known one with a structure in which a core sheet having longitudinal wall portions such as, for example, honeycomb cores is laminated between other sheets. This laminated plate is cut into a desired outline shape, and is thereby used as an interior material, an exterior material or the like for vehicles and buildings.

However, this type of laminated plate includes the core sheet having the longitudinal wall portions, and a thickness thereof is large, and accordingly, there has been a problem that an appearance of an end portion of the laminated plate is deteriorated if the end portion is just cut.

In this connection, Japanese Patent Laid-Open Publication No. 2001-18308 (hereinafter, referred to as Patent Literature 1) proposes a laminated plate in which the appearance of the end portion is enhanced by implementing end treatment for the cut end portion.

This Patent Literature 1 discloses a laminated plate obtained in such a manner that the laminated plate is squashed while being heated by thrusting a hot blade against the end portion thereof, whereby a bent portion is formed, and the bent portion is then bent upward to be fused onto a side portion of the laminated plate.

However, in the case of using such a method at the time of implementing the end treatment for a laminated plate having a complicated curved shape, a large wrinkle occurs on a portion with the complicated curved shape in the bent portion. Accordingly, the bent portion concerned has not been brought into good contact with a side end portion of the laminated plate. Specifically, in the above-described end treatment method, there has been a problem that restrictions occur on a shape of the laminated plate.

In this connection, it is an object of the present invention to obtain a laminated plate capable of enhancing the appearance of the end portion and enhancing a degree of freedom in the shape, and to obtain an end treatment method of the laminated plate.

DISCLOSURE OF THE INVENTION

An invention which achieves the above-described object, is an end treatment method of a laminated plate, including: a first step of supporting, by a support member, a thermoplastic resin-made laminated material in which a pair of plate-like members are laminated to each other while interposing a longitudinal wall so that a peripheral edge portion of the laminated material can be exposed, and heating and softening the peripheral edge portion by blowing a hot air to the peripheral edge portion; and a second step of pressing the plate-like member as one of the pair of plate-like members against other plate-like member by thrusting a cutting blade of a cutting die against the heated and softened peripheral edge portion, thereby bringing the pair of plate-like members into contact with each other and welding the plate-like members to each other, and then cutting the laminated plate out of the laminated material.

Moreover, a further invention is the end treatment method of a laminated plate, wherein the support member is a heat insulator.

Moreover, a further invention is the end treatment method of a laminated plate, wherein a coating material is pasted onto an outer surface of the laminated material.

Moreover, a further invention is a laminated plate including a thermoplastic resin-made body portion having a longitudinal wall portion and a pair of plate portions laminated to each other while interposing the longitudinal wall portion therebetween, wherein an end portion of the plate portion as one of the pair of plate portions is formed to be curved toward an end portion of other plate portion, and is welded to the other plate portion.

Furthermore, a further invention is the laminated plate, wherein a coating portion that coats an outer surface of the body portion is formed thereon.

BEST MODE FOR CARRYING OUT THE INVENTION

Figure 1:
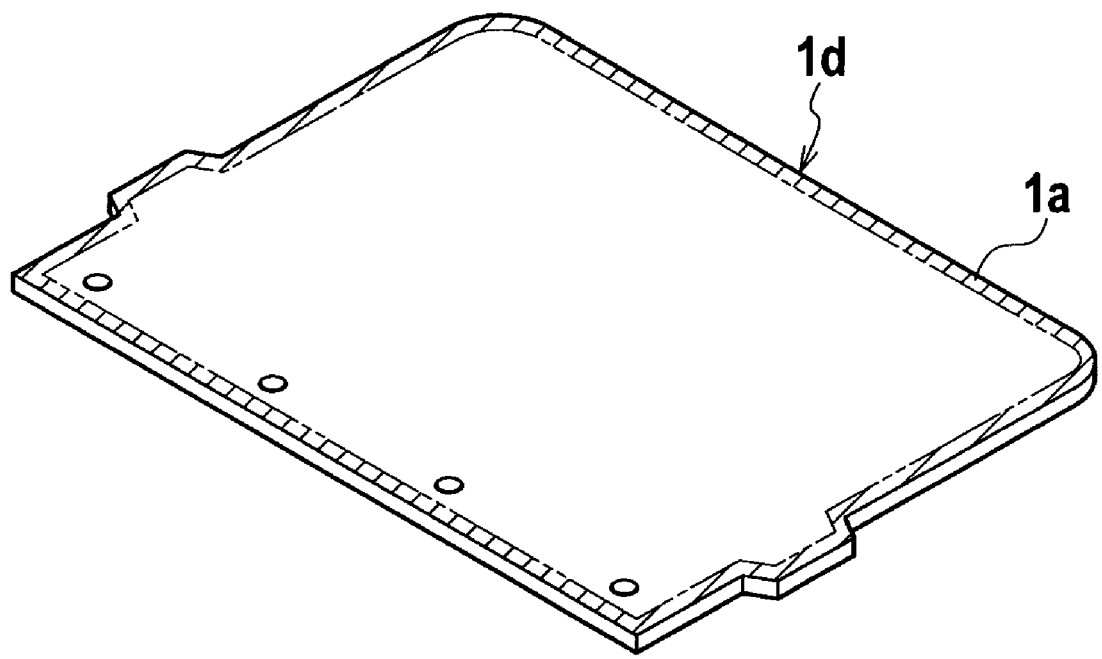
FIG. 1 is a perspective view showing a laminated material according to an embodiment of the present invention, onto which a nonwoven fabric is pasted.

A description will be made below in detail of an embodiment of the present invention while referring to the drawings. Here, a floorboard laid in a trunk room of an automobile is illustrated as a laminated plate.

Figure 2:
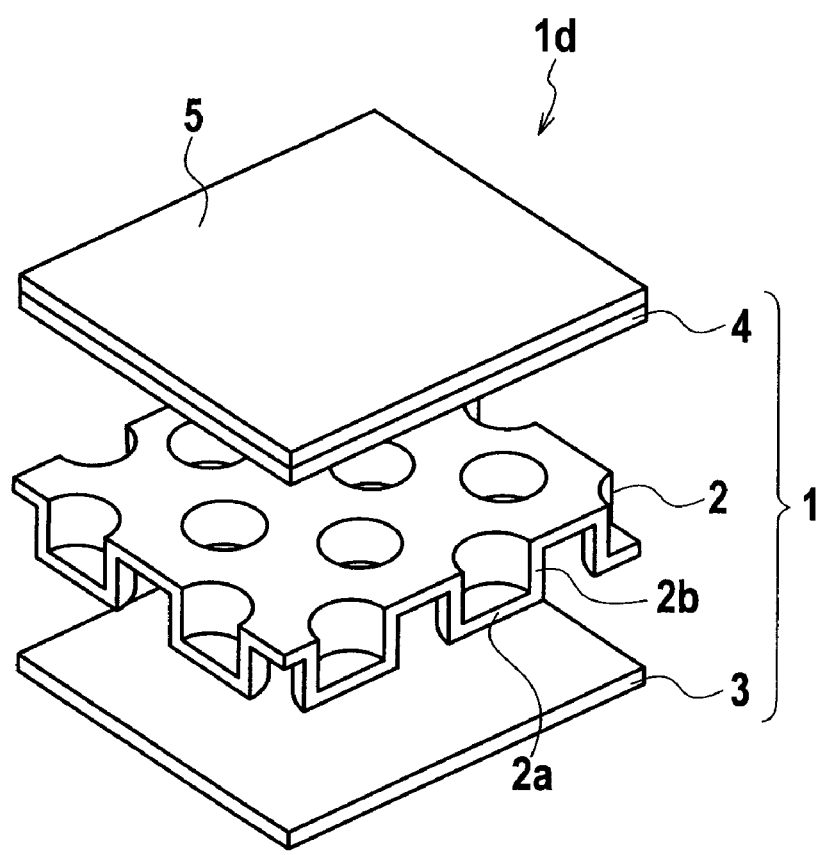
FIG. 2 is an exploded perspective view showing a structure of the laminated material according to the embodiment of the present invention, onto which the nonwoven fabric is pasted.
Figure 3:
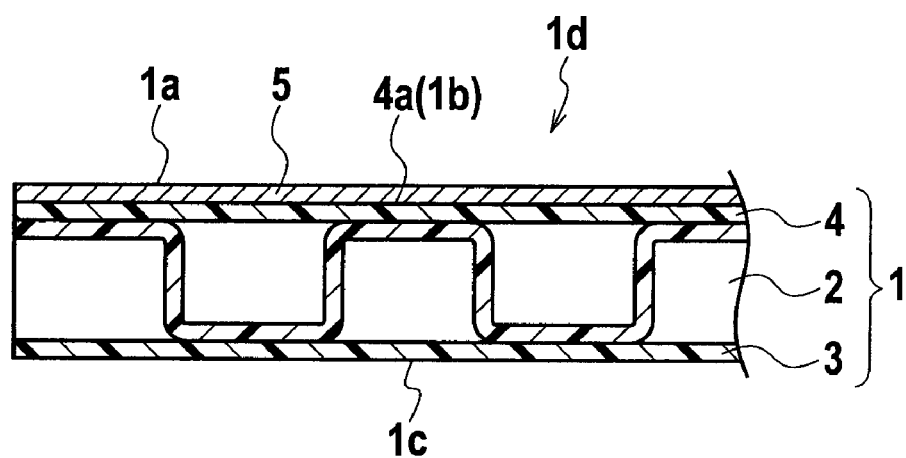
FIG. 3 is a cross-sectional view of the laminated material according to the embodiment of the present invention, onto which the nonwoven fabric is pasted.
Figure 4:
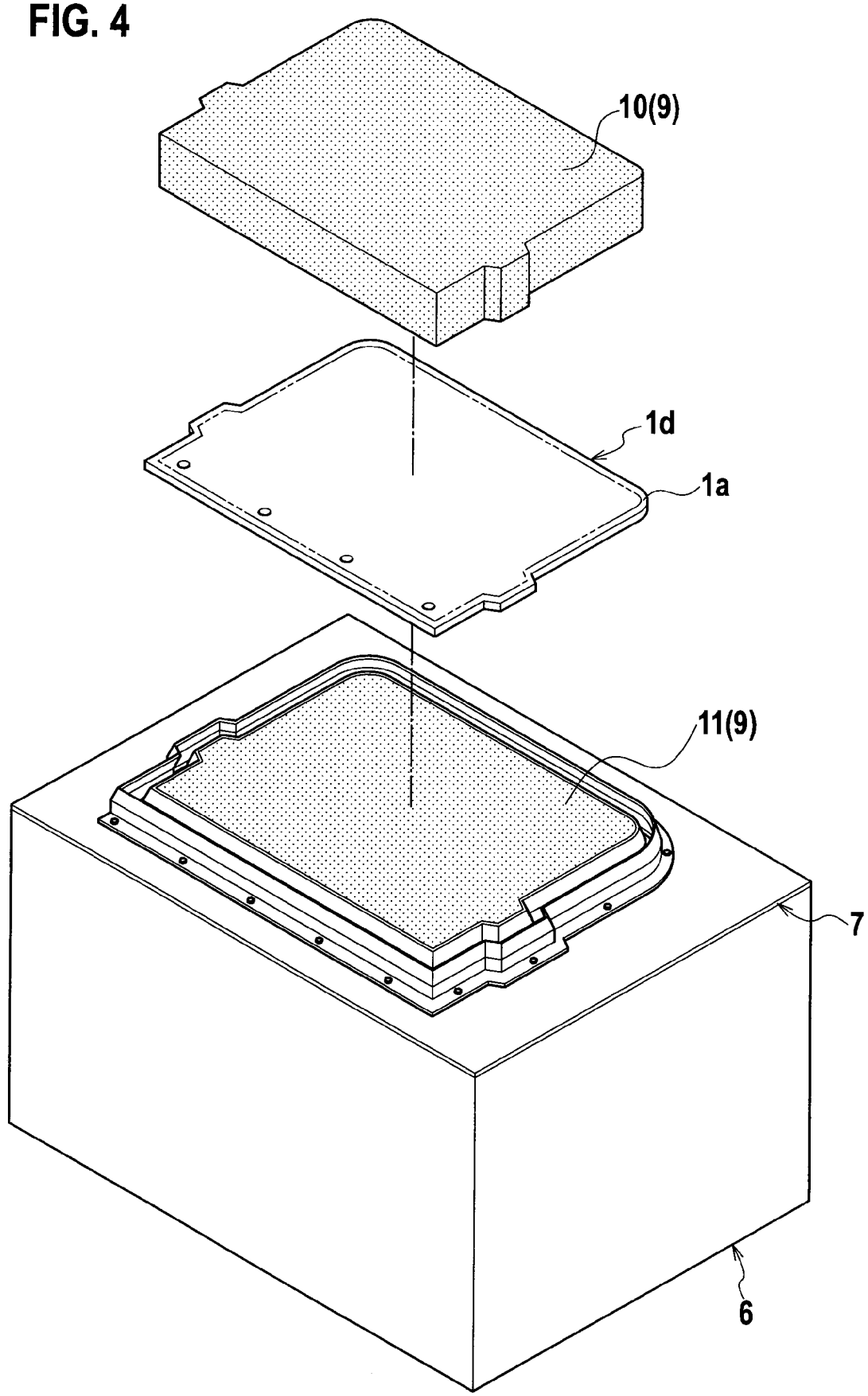
FIG. 4 is an exploded perspective view showing a state where the laminated material according to the embodiment of the present invention, onto which the nonwoven fabric is pasted, is mounted on a heating apparatus.
Figure 5:
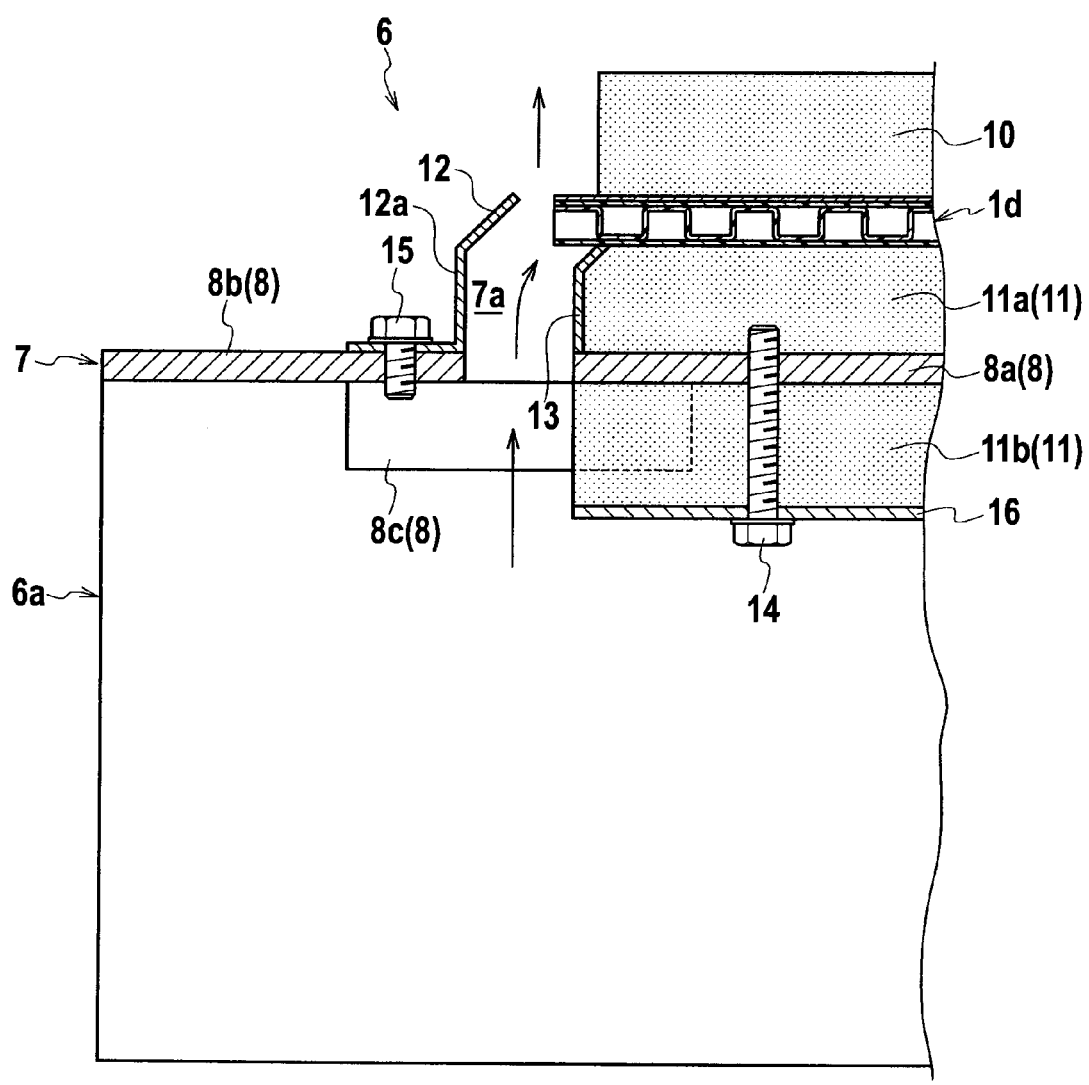
FIG. 5 is a cross-sectional view showing the state where the laminated material according to the embodiment of the present invention, onto which the nonwoven fabric is pasted, is mounted on the heating apparatus.
Figure 6:
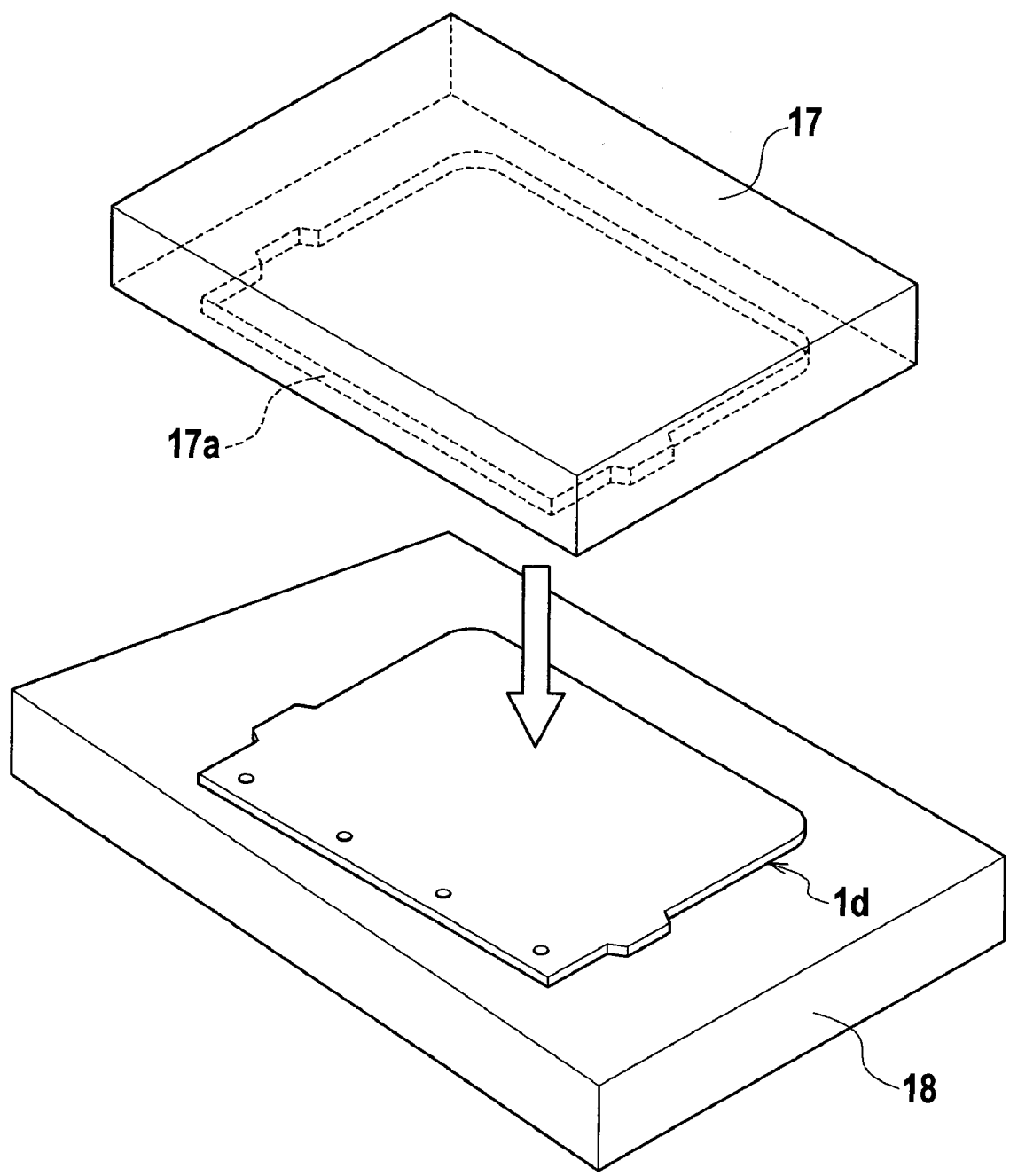
FIG. 6 is an exploded perspective view showing a state where the laminated material according to the embodiment of the present invention, onto which the nonwoven fabric is pasted, is mounted on a bearer.
Figure 7:
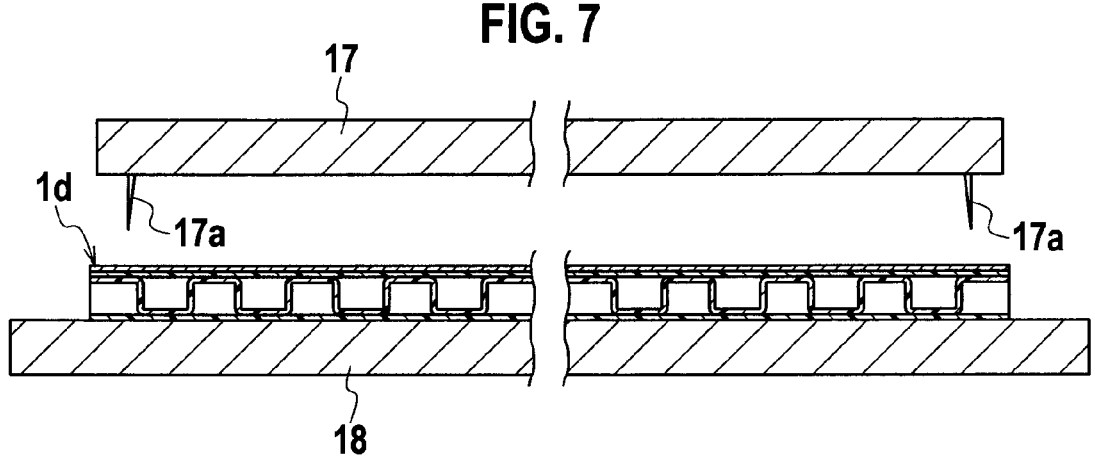
FIG. 7 is a cross-sectional view showing the state where the laminated material according to the embodiment of the present invention, onto which the nonwoven fabric is pasted, is mounted on the bearer.
Figure 8:
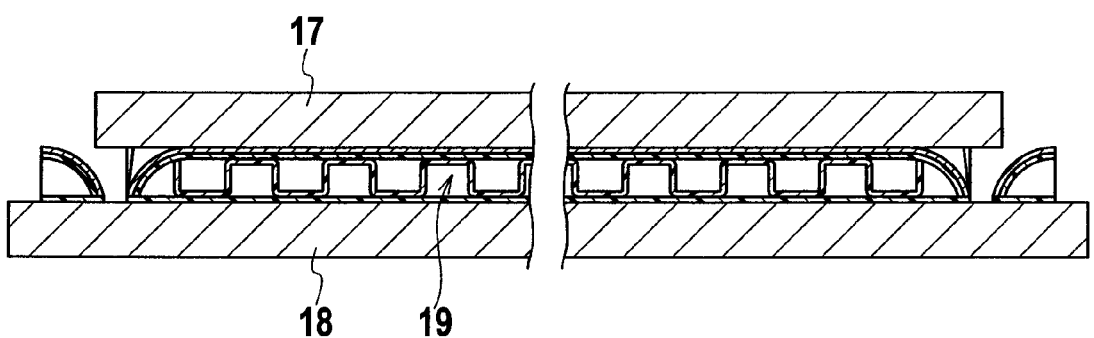
FIG. 8 is a cross-sectional view showing a state where the laminated material according to the embodiment of the present invention, onto which the nonwoven fabric is pasted, is cut out.
Figure 9:
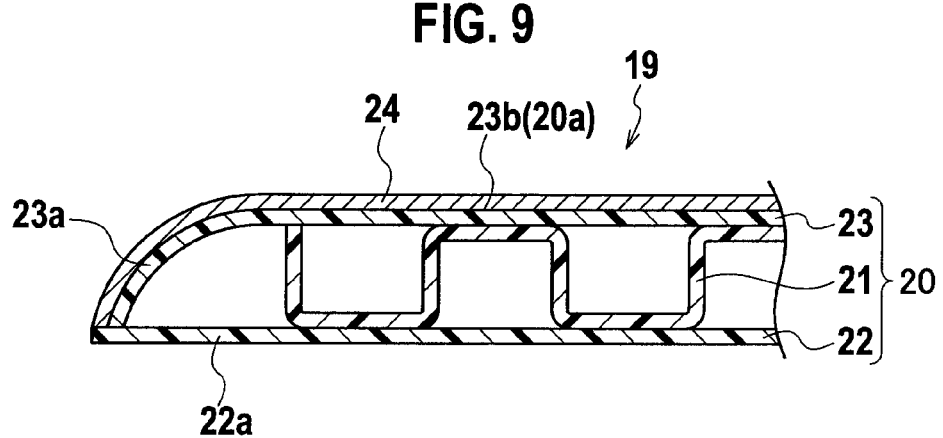
FIG. 9 is a cross-sectional view of a laminated plate according to the embodiment of the present invention.

FIG. 1 is a perspective view showing a laminated material according to this embodiment, onto which a nonwoven fabric is pasted, FIG. 2 is an exploded perspective view showing a structure of the laminated material onto which the nonwoven fabric is pasted, FIG. 3 is a cross-sectional view of the laminated material onto which the nonwoven fabric is pasted, FIG. 4 is an exploded perspective view showing a state where the laminated material onto which the nonwoven fabric is pasted is mounted on a heating apparatus, FIG. 5 is a cross-sectional view showing the state where the laminated material onto which the nonwoven fabric is pasted is mounted on the heating apparatus, FIG. 6 is an exploded perspective view showing a state where the laminated material onto which the nonwoven fabric is pasted is mounted on a bearer, FIG. 7 is a cross-sectional view showing the state where the laminated material onto which the nonwoven fabric is pasted is mounted on the bearer, FIG. 8 is a cross-sectional view showing a state where the laminated material onto which the nonwoven fabric is pasted is cut out, and FIG. 9 is a cross-sectional view of a laminated plate.

A floorboard (laminated plate) 19 according to this embodiment includes: a body portion 20 made of thermoplastic resin; and a coating portion 24 in which a surface (outer surface) 20a side of the body portion 20 is coated with a nonwoven fabric (coating material) 5.

The body portion 20 has a three-layer structure, and includes: a plurality of longitudinal wall portions 21; and a back surface plate portion 22 and a front surface plate portion 23, which are a pair of plate portions laminated to each other while interposing the longitudinal wall portions 21. Then, the nonwoven fabric 5 is pasted onto a surface 23b of the front surface plate portion 23.

Moreover, an end portion 23a of the front surface plate portion 23 as one of the plate portions is formed to be curved toward an end portion 22a of the back surface plate portion 22 as the other plate portion, and is welded to the back surface plate portion 22.

This floorboard 19 is formed by implementing end treatment for a laminated material 1.

As shown in FIG. 2, the laminated material 1 includes: a core sheet 2 uneven in cross section, which has a large number of columnar embossed portions 2a formed therein, and has longitudinal wall portions 2b; a plate-like cover sheet (plate-like member) 3 that is welded to the core sheet 2, and has a back surface 1c of the laminated material 1 formed thereon; and a plate-like cover sheet (plate-like member) 4 that is welded to the core sheet 2, and has a front surface 1b of the laminated material 1 formed thereon. Specifically, the laminated material 1 has a structure in which a pair of the cover sheets 3 and 4 are laminated to each other while interposing the core sheet 2 having the longitudinal wall portions 2b therebetween. Then, in this embodiment, each of the core sheet 2 and the cover sheets 3 and 4 is formed of non-air-permeable polypropylene resin (thermoplastic resin).

In this embodiment, the nonwoven fabric (coating material) 5 is bonded to a surface 4a of the cover sheet 4, that is, the front surface 1b of the laminated material 1, whereby a coating material-added laminated material 1d is formed.

The coating material-added laminated material 1d has a shape cut somewhat larger (larger by 5 to 6 mm in this embodiment) than an outline shape of a floor surface of the trunk room on which the laminated plate of this embodiment is laid, that is, than an outline shape of the floorboard 19. As shown in FIG. 1, a peripheral edge portion (peripheral edge portion of the laminated material) 1a of this coating material-added laminated material 1d serves as a region (hatched portion of FIG. 1) to be heated.

Next, a description will be made of an apparatus for use in the end treatment for the laminated plate.

A heating apparatus 6 has a substantial box form, and includes: a blower device housing chamber 6a open upward, in which a blower device (not shown) that blows out a hot air upward is housed; and a laminated material coating unit 7 that is mounted on an upper portion of the blower device housing chamber 6a, and serves for sandwiching the coating material-added laminated material 1d therein and performing coating therefor.

In this laminated material coating unit 7, a hot air blowing groove 7a for blowing the hot air to the outside is formed. In this embodiment, this hot air blowing groove 7a is formed of a groove portion of an iron plate 8, a steel plate 12, and a steel plate 13, which are to be described later. Then, the hot air blowing groove 7a is formed so that the peripheral edge portion 1a of the coating material-added laminated material 1d can protrude to the hot air blowing groove 7a side at the time of mounting the coating material-added laminated material 1d on the heating apparatus 6.

In this embodiment, the laminated material coating unit 7 includes: the substantially rectangular plate-like iron plate 8 having the groove portion; and a heat insulator 9 as a support member that supports the coating material-added laminated material 1d by sandwiching the coating material-added laminated material 1d concerned from front and back surfaces thereof.

Specifically, as shown in FIG. 5, the iron plate 8 includes: an inner iron plate 8a with an outline shape somewhat smaller than an outline shape of the coating material-added laminated material 1d; a substantially rectangular plate-like outer iron plate 8b hollowed out to have an outline shape somewhat larger than the outline shape of the coating material-added laminated material 1d; and a bridging iron plate 8c made to bridge these inner iron plate 8a and outer iron plate 8b. Then, the inner iron plate 8a is disposed in an inside of the outer iron plate 8b so that the groove portion can be formed between an outer side surface of the inner iron plate 8a and an inner side surface of the outer iron plate, and as shown in FIG. 5, the bridging iron plate 8c is welded to the inner iron plate 8a and the outer iron plate 8b in a state of bridging both thereof, whereby the iron plate 8 in which the groove portion is formed is formed.

Moreover, on an upper surface of the outer iron plate 8b, the steel plate 12 erected along an inner periphery of the outer iron plate 8b is provided, and as shown in FIG. 5, this steel plate 12 is attached to an inner peripheral edge portion of the outer iron plate 8b by bolts 15.

The heat insulator 9 includes: a fixed heat insulator 11 that supports the back surface of the coating material-added laminated material 1d; and a movable heat insulator 10 that supports the front surface of the coating material-added laminated material.

The fixed heat insulator 11 is fixed to the iron plate 8 by sandwiching the inner iron plate 8a by an upper fixed heat insulator 11a and a lower fixed heat insulator 11b.

The upper fixed heat insulator 11a has a shape in which an upper corner portion is chamfered along an outer periphery thereof, and as shown in FIG. 5, the steel plate 13 is provided on a side surface and chamfer of the upper fixed heat insulator 11a.

Meanwhile, the lower fixed heat insulator 11b has an outline shape corresponding to an outline shape of the inner iron plate 8a, and on an upper portion of the lower fixed heat insulator 11b, a fitting groove (not shown) for fitting the bridging iron plate 8c thereto at the time of attaching the bridging iron plate 8c to the inner iron plate 8a is provided. Moreover, on a lower surface of the lower fixed heat insulator 11b, a stainless steel plate 16 is provided.

Then, in this embodiment, as shown in FIG. 5, these upper fixed heat insulator 11a, inner iron plate 8a, lower fixed heat insulator 11b and stainless steel plate 16 have bolts 14 inserted therethrough from below in a stacked state, and are thereby fixed to the iron plate 8.

Moreover, above the upper fixed heat insulator 11a, the movable heat insulator 10 is disposed for sandwiching the coating material-added laminated material 1d in cooperation with the upper fixed heat insulator 11a of the fixed heat insulator 11.

Note that, in the above-described heating apparatus 6, the laminated material coating unit 7 is attached thereto so as to be detachable therefrom. Accordingly, if a plurality of laminated material coating units in which outline shapes of hot air blowing grooves are different from one another are formed, then these laminated material coating units can be replaced as appropriate, and it becomes possible to implement the end treatment for laminated plates with a variety of outline shapes.

A cutting die 17 and a bearer 18 are devices for simultaneously performing the end treatment and die cutting for the coating material-added laminated material 1d. In the cutting die 17, a cutting blade 17a in which an outline shape is made to correspond to the outline shape of the floorboard 19 is provided.

Next, a description will be made of a manufacturing method of the floorboard 19.

(First Step)

First, as shown FIG. 3 and FIG. 4, the coating material-added laminated material 1d in which the nonwoven fabric 5 is pasted onto the surface 4a of the cover sheet 4 is mounted on the heating apparatus 6. Specifically, the movable heat insulator 10 is moved down in a state where the coating material-added laminated material 1d is mounted on the fixed heat insulator 11 so that the peripheral edge portion 1a thereof can protrude to the hot air blowing groove 7a side, the hot air blowing groove 7a being formed in the laminated material coating unit 7. In such a way, the coating material-added laminated material 1d is sandwiched between the fixed heat insulator 11 and the movable heat insulator 10.

Then, the hot air is blown out upward from a hot air blowing device (not shown) in such a state where the coating material-added laminated material 1d is sandwiched as described above. Note that arrows in FIG. 5 indicate a flow of the hot air. At this time, the hot air blown to the outside through the hot air blowing groove 7a is blown to the peripheral edge portion 1a of the coating material-added laminated material 1d, which protrudes to the hot air blowing groove 7a side, and the peripheral edge portion 1a is heated and softened. In this embodiment, a hot air of approximately 300° C. is blown out upward at an air velocity of approximately 5 m/s. Then, the hot air is blown to the peripheral edge portion 1a of the coating material-added laminated material 1d for approximately 10 to 15 seconds, whereby the peripheral edge portion 1a is heated and softened.

(Second Step)

Next, the coating material-added laminated material 1d in which the peripheral edge portion 1a is heated and softened is moved and mounted on the bearer 18. In this embodiment, the coating material-added laminated material 1d is mounted on the bearer 18 in a state where the nonwoven fabric 5 is made to face upward. Moreover, the coating material-added laminated material 1d is mounted on the bearer in a state of being positioned so that the peripheral edge portion 1a thereof can be cut by the cutting blade 17 of the cutting die 17. Note that such positioning of the coating material-added laminated material 1d can be performed by a variety of methods, for example, by mounting, on a predetermined position of the bearer 18, the coating material-added laminated material 1d sucked to a suction cup of a robot arm allowed to memorize operations.

Then, the cutting die 17 is pressed toward the bearer 18 while thrusting the cutting blade 17a of the cutting die 17 against the peripheral edge portion 1a of the coating material-added laminated material 1d mounted on the bearer 18.

Then, the cover sheet 4 in which the nonwoven fabric 5 is pasted onto the surface 4a contacts the cover sheet 3 and is welded thereto while being pressed and formed to be curved by the cutting blade 17a of the cutting die 17. When the cutting die 17 is further pressed, the coating material-added laminated material 1d is cut by the cutting blade 17a of the cutting die 17, and the floorboard 19 as the laminated plate is cut out of the coating material-added laminated material 1d.

In such a way, formed is the floorboard 19 including the body portion 20 having: the plurality of longitudinal wall portions 21; and the back surface plate portion 22 and the front surface plate portion 23, which are laminated to each other while interposing the longitudinal wall portions 21 therebetween, in which the end portion 23a of the front surface plate portion 23 is formed to be curved toward the end portion 22a of the back surface plate portion 22, and is welded to the back surface plate portion 22.

In accordance with this embodiment described above, first, the peripheral edge portion (peripheral edge portion of the laminated material) 1a of the coating material-added laminated material 1d is heated and softened, in which the nonwoven fabric 5 is bonded to the surface 1b of the laminated material 1 formed by laminating the pair of cover sheets 3 and 4 to each other while interposing the core sheet 2 having the longitudinal wall portions 2b therebetween. Next, the cutting blade 17a of the cutting die 17 is thrust against the heated and softened peripheral edge portion 1a, and the cover sheet 4 as one of the pair is brought into contact with and welded to the other cover sheet 3. Just in such a way, the floorboard 19 can be cut out of the coating material-added laminated material 1d. Accordingly, the outline shape of the floorboard 19 in the state of being subjected to the end treatment can be made to a complicated shape, and a degree of freedom in shape of the floorboard 19 can be enhanced.

Moreover, the coating material-added laminated material 1d is used, whereby the die cutting can be performed in the state where the nonwoven fabric 5 is pasted onto the surface 1b of the laminated material 1. Accordingly, the floorboard 19 in which design is enhanced can be obtained easily.

Moreover, in accordance with this embodiment, at the time of heating and softening the peripheral edge portion 1a of the coating material-added laminated material 1d, a region (coated region) other than the heated and softened peripheral edge portion 1a of the coating material-added laminated material 1d is sandwiched by the heat insulator 9, whereby the coated region can be suppressed from being heated. As a result, linear expansion of the coated region by the heat can be suppressed, and distortion can be suppressed from occurring in the floorboard 19 at the time of forming the floorboard 19.

Furthermore, in accordance with this embodiment, the floorboard 19 has a structure in which the end portion 23a of the front surface plate portion 23 as one of the plate portions is welded to the back surface plate portion 22 as the other plate portion while being formed to be curved toward the end portion 22a of the back surface plate portion 22. Accordingly, the end of the floorboard 19 can be finished off to a good appearance.

Moreover, in accordance with this embodiment, the floorboard 19 has a structure in which the coating portion 24 is formed by pasting the coating material onto the surface 20a of the body portion 20. Accordingly, the design of the floorboard 19 can be enhanced.

The description has been made above of the preferred embodiment of the laminated plate according to the present invention; however, the present invention is not limited to the above-described embodiment, and a variety of embodiments can be adopted within the scope without departing from the gist of the present invention.

For example, though the laminated material made of the polypropylene resin is used in the above-described embodiment, the laminated material just needs to be made of the thermoplastic resin, and the laminated material may be formed of resin of botanical origin, for example, such as polylactic acid resin.

Moreover, though the nonwoven fabric is used as the coating material in this embodiment, other fabrics, leather skins and the like may be used.

Furthermore, though the coating material-added laminated material in which the nonwoven fabric is pasted onto the surface of the laminated material is used in this embodiment, one in which the nonwoven fabrics are pasted onto both of the front and back surfaces of the laminated material may be used, or it is also possible to use the laminated material without pasting the nonwoven fabric thereonto.

Moreover, though the core sheet on which the columnar embossed portions are formed is used in this embodiment, a variety of sheets having the longitudinal wall portions can be used without being limited to the above.

Note that, though the floorboard has been illustrated as the laminated plate in the above-described embodiment, the present invention can be embodied even in the case of using other interior and exterior materials for vehicles and buildings.

Industrial Applicability

In accordance with the present invention, there can be obtained the laminated plate capable of enhancing the appearance of the end portion and enhancing the degree of freedom in the shape, and the end treatment method of the laminated plate.

The invention claimed is:

1. An end treatment method of a laminated plate, comprising:
a first step of supporting a thermoplastic resin-made laminated material in which a pair of plate-like members are laminated to each other with a longitudinal wall interposed therebetween, by sandwiching the laminated material from front and back surfaces thereof by a support member such that a peripheral edge portion of the laminated material is exposed, and heating and softening the peripheral edge portion by blowing a hot air to an entirety of the peripheral edge portion; and
a second step of pressing one of the plate-like members against an other of the plate-like members by thrusting a cutting blade of a cutting die against the heated and softened entirety of the peripheral edge portion, thereby bringing the pair of plate-like members into contact with each other and welding the plate-like members to each other, and then cutting the laminated plate out of the laminated material,
wherein, in the first step, supporting the laminated material is performed by sandwiching the laminated material such that the entirety of the peripheral edge portion thereof is exposed, and heating and softening of the peripheral edge portion is performed by blowing the hot air to the entirety of the peripheral edge portion.

2. The end treatment method of a laminated plate according to claim 1, wherein the support member is a heat insulator.

3. The end treatment method of a laminated plate according to claim 2, wherein a coating material is pasted onto an outer surface of the laminated material.

4. The end treatment method of a laminated plate according to claim 1, wherein a coating material is pasted onto an outer surface of the laminated material.

* * * * *